US005134901A

United States Patent [19]

Grady

[11] Patent Number: 5,134,901

[45] Date of Patent: Aug. 4, 1992

[54] INTERCONNECT CASING AND POWER DIVIDER EMPLOYING THE CASING

[75] Inventor: Clarence A. Grady, Newport, Oreg.

[73] Assignee: Odin Foam Company, Newport, Oreg.

[21] Appl. No.: 567,864

[22] Filed: Aug. 15, 1990

Related U.S. Application Data

[63] Continuation-in-part of Ser. No. 539,607, Jun. 18, 1990, abandoned, which is a continuation of Ser. No. 732,940, Jul. 19, 1991, Pat. No. 5,096,389.

[51] Int. Cl.[5] ........ F16H 57/02; B62J 13/00

[52] U.S. Cl. ........ 74/606 R; 474/144

[58] Field of Search ........ 74/606 R; 474/184, 188, 474/189, 144, 145, 150, 148; 417/364

[56] References Cited

U.S. PATENT DOCUMENTS

| | | | |
|---|---|---|---|
| 602,580 | 4/1898 | Haskins et al. | 74/606 R |
| 1,226,785 | 5/1917 | McCargar | 74/15.2 |
| 1,455,899 | 5/1923 | Cabelinski | 474/144 X |
| 1,872,330 | 8/1932 | Peele | 74/606 R |
| 1,985,022 | 12/1934 | De Bothezat | 417/362 |
| 2,010,796 | 8/1935 | Bourque | 474/144 |
| 2,240,998 | 5/1941 | Montiglio | 474/144 |
| 2,826,354 | 3/1958 | Field | 417/362 |
| 3,001,409 | 9/1961 | Von Fumetti | 74/11 |
| 3,111,852 | 11/1963 | May et al. | 74/15.63 |
| 3,165,004 | 1/1965 | Kumro | 474/150 |
| 3,379,132 | 4/1968 | Wagner | 417/362 |
| 3,727,847 | 4/1973 | Nelson | 74/11 X |
| 3,813,956 | 6/1974 | Whitecar | 474/144 X |
| 3,885,471 | 5/1975 | Morine et al. | 474/144 |
| 4,488,447 | 12/1984 | Gebhardt | 74/397 |
| 4,573,365 | 3/1986 | Kennard et al. | 74/15.8 |
| 4,594,906 | 6/1986 | Vincent et al. | 74/15.4 |
| 4,610,175 | 9/1986 | Weis et al. | 74/15.86 |
| 4,648,855 | 3/1987 | Palloch et al. | 474/144 |
| 4,664,253 | 5/1987 | Fahrion | 474/145 X |
| 4,741,676 | 5/1988 | Janes | 417/362 |
| 4,743,172 | 5/1988 | Watson | 417/362 |
| 4,801,288 | 1/1989 | Schmitt et al. | 474/144 X |
| 5,096,389 | 3/1992 | Grady | 417/364 |

FOREIGN PATENT DOCUMENTS

| | | | |
|---|---|---|---|
| 1163836 | 3/1984 | Canada | 74/606 R |
| 0161352 | 10/1982 | Japan | 474/144 |

OTHER PUBLICATIONS

Cummins Rear Engine Power Take-Off advertisement (1987 Cummins Engine Company Inc., Bulletin 3605114, Printed in USA Dec. 1987).

*Primary Examiner*—Vinh T. Luong
*Attorney, Agent, or Firm*—Kolisch, Hartwell, Dickinson, McCormack & Heuser

[57] ABSTRACT

The invented interconnect casing includes first and second flanges, a spacer associated with and intermediate the first and second flanges, an aperture in the spacer, and a bracket arm attached to one of the flanges for supporting a driven device. The invented power divider includes an engine having a drive shaft, a first flange mounted to the engine adjacent the drive shaft, a second flange mounted to a first device, a spacer that is associated with and intermediate the first and second flanges, an aperture in the spacer allowing access to the drive shaft, and a bracket arm attached to and extending from one of the flanges for supporting a second device.

5 Claims, 3 Drawing Sheets

INTERCONNECT CASING AND POWER DIVIDER EMPLOYING THE CASING

This is a constitution-in-part of abandoned application Ser. No. 07/539,607, filed Jun. 18, 1990, which is a parent of continuation application Ser. No. 07/732,940 filed Jul. 19, 1991 now U.S. Pat. No. 5,096,389 issued on Mar. 17, 1992.

TECHNICAL FIELD

This invention relates to interconnect casings and power dividers. More particularly, this invention relates to an interconnect casing used in a power divider capable of driving at least two devices, such as a foam discharging apparatus.

BACKGROUND ART

A power divider is a device that divides the power from a single engine so that it may be used to drive a plurality of other devices. A power divider is also known as a power take-off.

Typically a power divider includes an internal combustion engine that drives devices such as compressors and pumps. In such cases, the power divider generally includes gears that allow the engine's drive shaft to be connected to the input shafts of the devices. However, the necessary gear trains are complicated, require maintenance and are expressive.

The invented power divider provides a simple, expensive yet efficient alternative to the power dividers that use gears. It is particularly useful in an apparatus that drives at least two devices, such as a foam discharging apparatus used to fight fires.

DISCLOSURE OF THE INVENTION

The invented interconnect casing includes first and second flanges, a spacer connected to and intermediate the first and second flanges, an aperture in the spacer, and a bracket arm attached to one of the flanges for supporting a driven device. The flanges may simply be rings, and the spacer may be a tube-like metal sheet connected to and extending between the rings.

The invented power divider is capable of driving at least two devices and includes an engine having a drive shaft with the interconnect casing mounted to the engine around the drive shaft. The interconnect casing's second flange supports one of the driven devices and the bracket arm supports another one of the devices. For example, the invented power divider can be used in a foam discharging apparatus that includes an engine, a fluid pump and an air compressor both driven by the engine, where the pump and compressor are connected to the engine by the invented interconnect casing.

DETAILED DESCRIPTION AND BEST MODE FOR CARRYING OUT THE INVENTION

Figure 1:
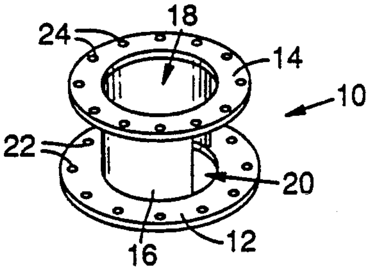
FIG. 1 is a perspective view of the invented interconnect casing.

The invented interconnect casing is shown generally at 10 in FIG. 1. It includes a first flange 12, a second flange 14, and a spacer 16 that is connected to and intermediate the first and second flanges.

Flanges 12 and 14 may be made from rings, and spacer 16 may be a tube-like sheet of metal welded to the rings. In that manner spacer 16 connects flanges 12 and 14 and holds them apart a predetermined distance, thereby creating a region 18 between the first and second flanges.

An aperture 20 exists in spacer 16 to allow access to region 18. Aperture 20 may face in any direction and additional apertures may also be cut in spacer 16 to also allow access to region 18.

First flange 12 may be thought of as a first attachment means for mounting to an engine or device. In other words, flange 12 may be bolted to an engine or similar device through bolt holes such as those identified at 22. Similarly, second flange 14 may be though of as a second attachment means for mounting to a second device. Second flange 14 also includes bolt holes such as those identified at 24.

Spacer 16 may be through of as spacer means for establishing region 18. Spacer means includes any structure capable of securely holding the first and second attachment means apart. Aperture 20 may be thought of as aperture means for allowing access to region 18. Alternatively, the spacer means may be thick enough so that bolt holes extend through it, eliminating the need for flanges 12 and 14. In that case, the ends of the spacer means would be the first and second attachment means, respectively.

Figure 2:
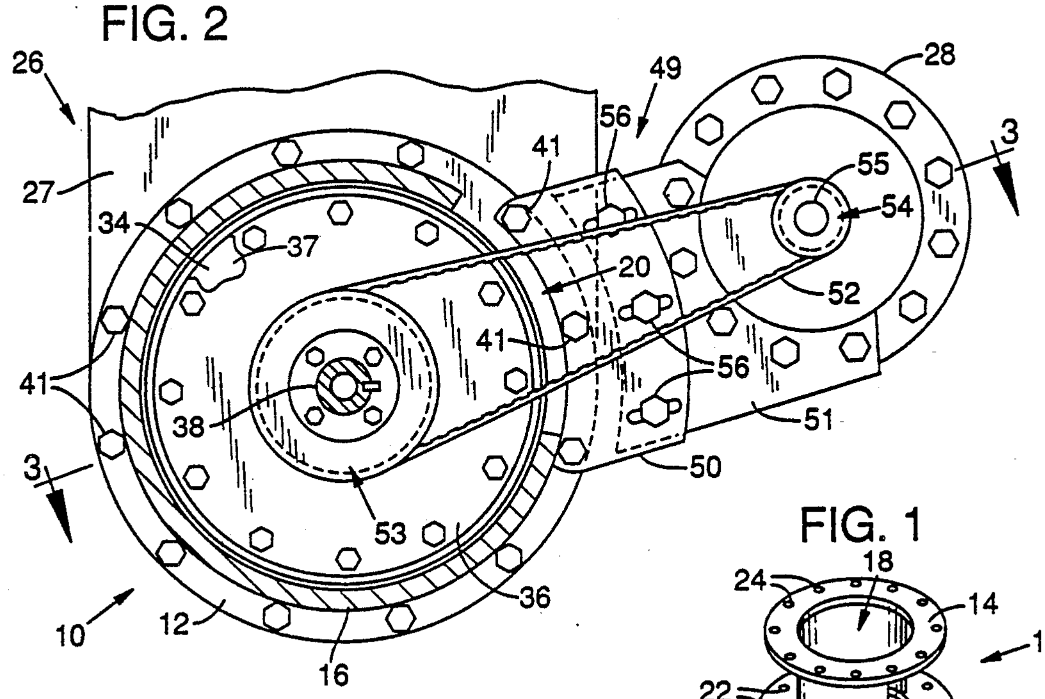
FIG. 2 is a front, sectional view of the invented power divider, shown in the interconnect casing attached to an engine and an air compressor.
Figure 3:
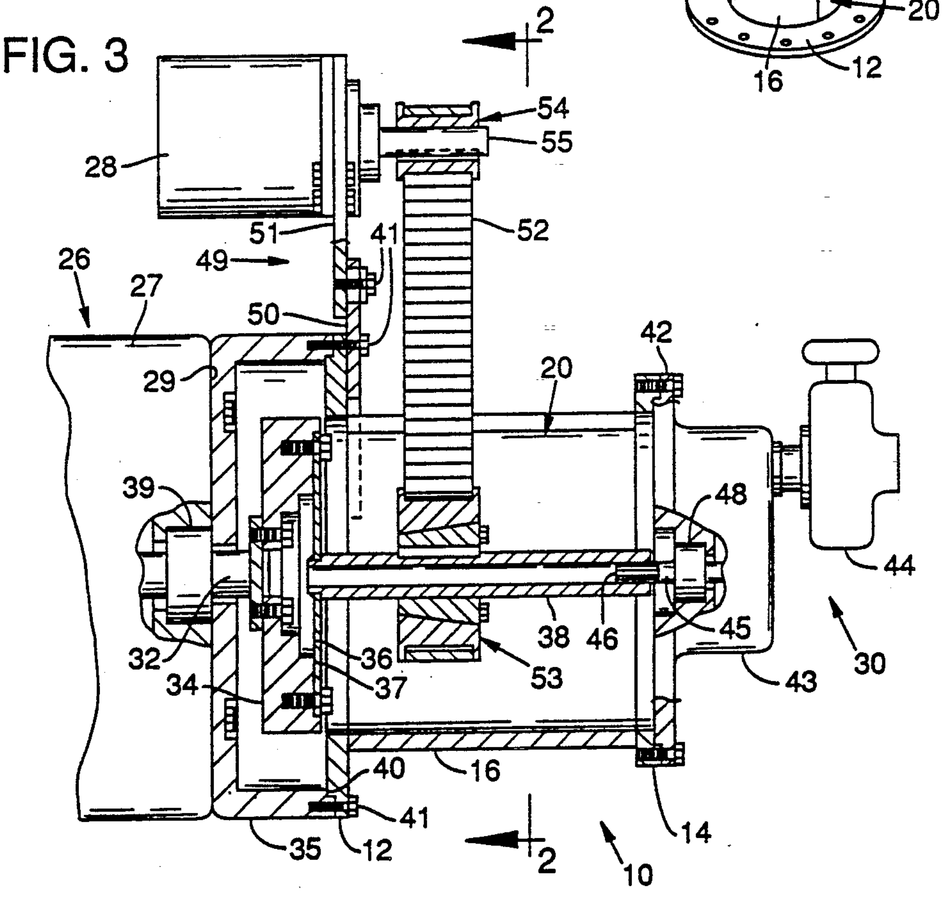
FIG. 3 is a side, sectional view, taken along the line 3—3 in FIG. 2, showing the invented interconnect casing attached to an engine, an air compressor and a fluid pump.
Figure 4:
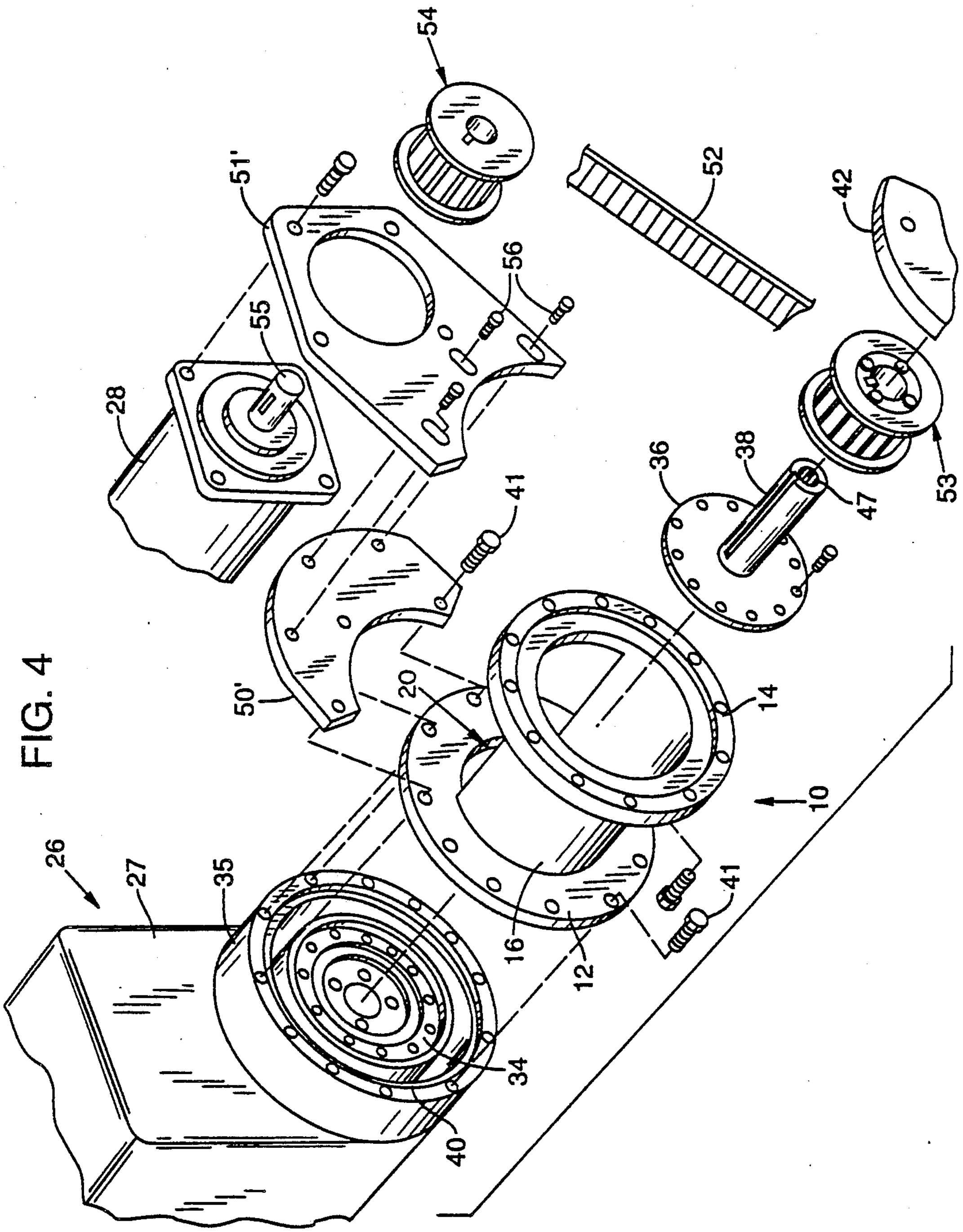
FIG. 4 is an exploded view of a different embodiment of the invented power divider.

The invented power divider, or apparatus to drive at least two devices, is shown in FIGS. 2, 3 and 4. FIG. 2 is a front, sectional view of casing 10 mounted to an engine 26 and an air compressor 28. FIG. 3 is a side sectional view showing casing 10 mounted to engine 26, compressor 28 and a fluid pump 30. FIG. 4 is an exploded view of a different embodiment of the invention, similar to the apparatus shown in FIG. 3.

Engine 26 includes a housing 27, a face flange 29, a crank shaft 32, a flywheel 34 bolted to the crank shaft, and a flywheel housing 36 bolted directly to the face flange of the engine. Housing 27 and flywheel housing 35 together may be thought of as the engine's casing.

Flywheel 34 includes face flange 37 to which a flex plate 36 is bolted. Flex plate 36 is, in turn, connected to a stub shaft 38. The flex plate is used for shock dampening and to counter imperfections in alignments and manufacturing. The stub shaft may be welded to the flex plate, connected through a splined joint, or connected in any other known manner. The stub shaft, flywheel, flex plate and crank shaft may collectively be referred to as a drive shaft. The drive shaft is supported by internal bearing 39 (shown schematically in FIG. 3). Engine 26 may be a diesel or gas engine, a split-shaft power take-off, a hydraulic or electric engine, or any other similar device.

Flywheel housing 35 has a face flange 40 to which first flange 12 of the invented interconnect casing is attached. Flange 12 is mounted around the drive shaft by bolts such as those identified at 41.

Typically, engines are constructed according to the standards set forth by the Society of Automotive Engineers (SAE). Thus, face flange 29 of engine 26 would have a standard SAE size and the face flange 40 on the flywheel housing would also have a standard SAE size. Accordingly, flange 12 on the invented casing would have a standard SAE size corresponding to the flywheel housing. Additionally, if the engine or flywheel housing has standard SAE pilots on their face flanges then flange 12 may have corresponding SAE pilots. The pilots may be used to maintain the engineer's drive shaft in the center of the casing. The sizing of flywheel housing 35 and flange 12 may vary, and other standards such as those set by the National Electric Manufacturers Association (NEMA) or the Deutsche Industrie Normenausschuss (DIN) may be used instead of SAE.

Second flange 14 of the divider is bolted to another device such as fluid pump 30. Pump 30 includes a mounting flange 42, a gear box 43 and a pump housing 44. Gear box 43 may be used to either speed up or slow down the pump. Mounting flange 42 may also have a standard SAE, NEMA or DIN size with pilots, in which case flange 14 would have a corresponding size and pilots. Second flange 14 may be a different size or the same size as first flange 12.

Casing 10 is positioned around the engine's drive shaft so that pump 30 directly engages and is driven by the stub shaft 38. Fluid pump 30 also includes an input drive shaft 45 that includes a male splined end 46. Accordingly, stub shaft 38 includes a female splined end 47 to directly engage shaft 45. Shaft 45 is supported by input shaft bearings 48 in pump 30 (shown schematically in FIG. 3).

Casing 10, by supporting pump 30, allows the pump's input shaft bearings to also support the engine's drive shaft. This is done through the splined connection between shafts 38 and 45, and the bearings are the only support for the engine's drive shaft that is external to the engine itself.

Casing 10 also includes a support means or bracket arm 49 attached to flange 12 and extending outwardly therefrom. As shown in FIGS. 2 and 3, bracket arm 49 includes a first plate 50 that is bolted directly to flange 12, and a second plate 51 that is adjustably bolted to first plate 50 by bolts 56. Plates 50 and 51, by being bolted directly to flange 12 which in turn is bolted to the flywheel housing, are held parallel to the engine's face flange 29 and therefore are perpendicular to the engine's drive shaft. A second device, such as air compressor 28 is then bolted to second plate 51. FIG. 4 shows a different embodiment of bracket arm 49 including plates 50' and 51'.

The air compressor is driven by a toothed belt 52 that extends through aperture 20 and around a first pulley 53 attached to stub shaft 38 by any known means. The belt also extends around a second pulley 54 attached to an input shaft 55 on compressor 28. Belt 52 transfers power from engine 26 through a bearingless, gearless and oilless mechanism.

Alignment of the belt, air compressor and the engine's drive shaft is maintained because arm 49 is perpendicular to the engine's drive shaft. By sizing flanges 12 and 14 to SAE, DEMA or DIN sizes, a perfect lineal plane with the engine and drive shaft will always be maintained without additional supports such as adjustable torque arms. Belt 52 is aligned by moving pulley 53 on stub shaft 38 until it is aligned with pulley 54 on input shaft 55 of compressor 28. The two pulleys can be aligned with a straight edge. Pulley 53 is then secured to shaft 38, and belt 52 can be placed around the pulleys and tightened by adjusting first and second plates 50 and 51. This construction allows for belt replacement or flywheel replacement without requiring realignment of the pulleys.

Different sized pulleys may be used to obtain the power ratio needed to drive the air compressor. Additionally, a chain drive will work to transfer power instead of a belt. In that case, sprockets would replace pulleys 53 and 54 and a chain would replace belt 52. The term "pulley" may be used to mean both pulleys and sprockets and the term "belt" may be used to mean both belts and chains. Additional apertures may also be cut in spacer 16 to allow additional devices to be driven by the drive shaft.

By extending the distance between first flange 12 and second flange 14, a lineal clutch can be mounted to the end of stub shaft 38 to control the operation of pump 30. Additionally, a straddle clutch could be placed over stub shaft 38 to control the operation of compressor 28.

As can be seen in the drawings, the only support for the interconnect casing is the engine to which it is mounted. The engine itself typically has feet or is mounted on a support structure, frame or vehicle. The only support for the fluid pump, apart from the drive shaft, is flange 14 and the only support for the air compressor is bracket arm 49. This configuration allows all components to move with the engine, thereby protecting them from independent vibration, torque and torsional impact. If the fluid pump or air compressor were mounted to separate structures, the engine's vibration and their own vibrations could damage the system.

The invented interconnect casing also allows for a compact, safe and efficient transfer of horse power from the engine. As stated, bearings 39 and 48 supports the engine's drive shaft. Additionally, pulley 53 is positioned near flex plate 36 and its side pull is supported by bearings 39. This compact arrangement, in conjunction with the common vibration of the engine, pump and air compressor, allows for power division without violating typical engine, pump or compressor manufacturer's warranties. Fifty percent or more of the engine's horse power may be transferred laterally by belt or chain without bearing support other than bearings 39 and 48.

Figure 5:
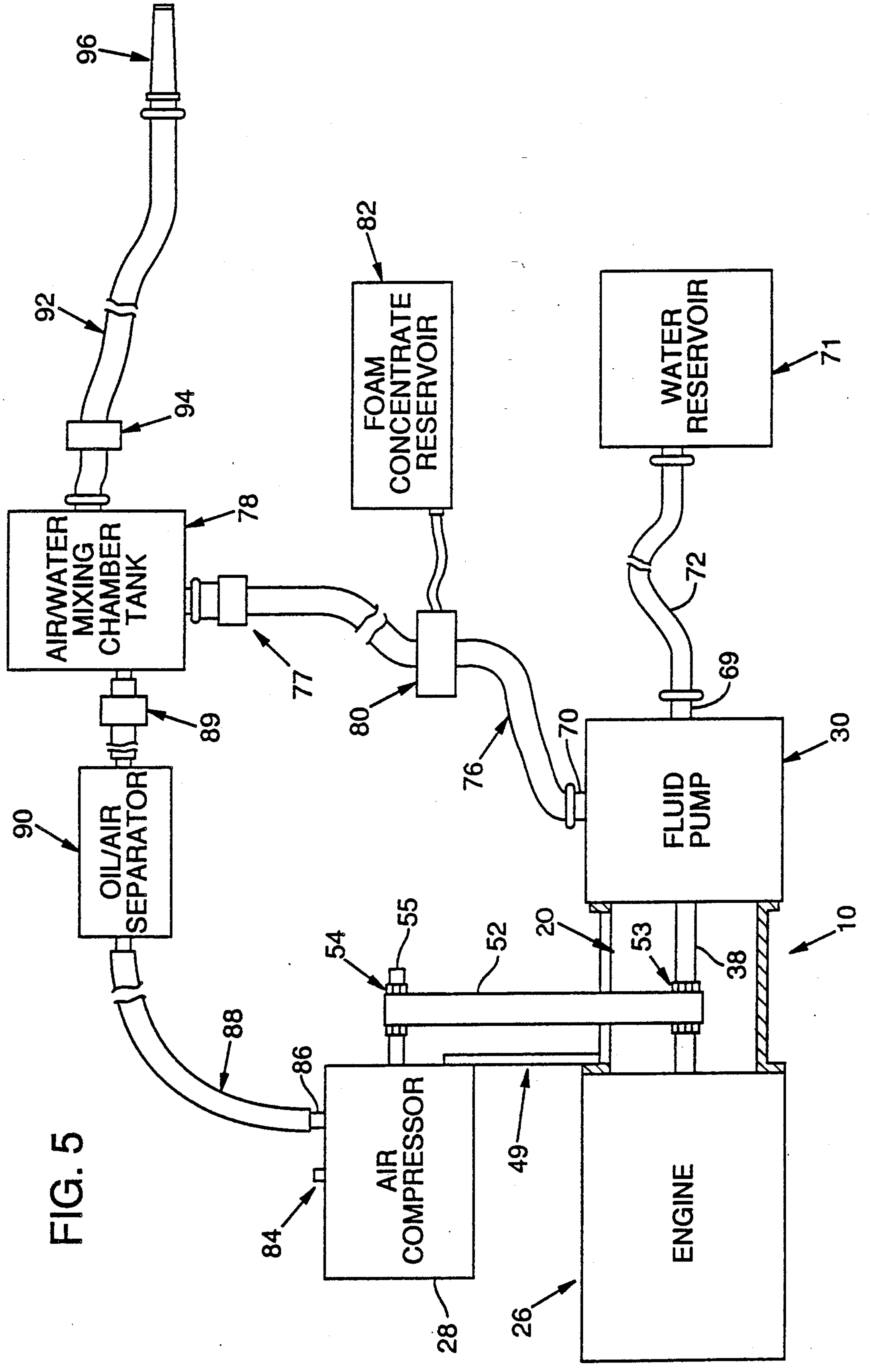
FIG. 5 is a simplified view of the invented foam discharging apparatus employing the invented power divider.

One of the intended applications of the invented power divider is in a foam discharging apparatus such as displayed in FIG. 5. Engine 26 is connected to casing 10, which in turn supports air compressor 28 and fluid pump 30. Engine 26 is mounted to a structure such as a support frame, as is known in the art.

Fluid pump 30 includes an intake 69 and an exhaust 70. The pump directs water from a water reservoir 71 through a means connecting the water reservoir to the fluid pump's intake such as hose 72. The pump then directs the water through exhaust 70 and out a first fluid output chaneling means such as hose 76, through a control valve 77 to an air/water mixing chamber tank 78. The first fluid output chaneling means may include an injection means 80, such as an injector or aspirator, and a foam concentrate reservoir 82 connected to the injection means. The injection means functions to inject foam concentrate into the water.

The air compressor includes an intake 84 and an exhaust 86. The compressor directs air out exhaust 86 through a second output channeling means, such as hose 88, and through a control valve 89 to the air/water mixing chamber tank. If the air compressor is oil lubricated, the air may pass through an oil/air separator 90.

In tank 78, air supplied by compressor 28 is combined under pressure with the water solution supplied by pump 30, thereby foaming foam. Connected to tank 78 is an output hose 92. The discharge of output hose 92 is controlled by an on/off valve 94. Hose 92 terminates at its end with nozzle 96.

As is illustrated by this embodiment, the invented power divider can be described as a means for operably connecting two devices to an engine, where the means for operably connecting allows one device to directly engage the drive shaft and another device to be driven by the drive shaft without gears. Additionally, the means for operably connecting allows for one or more devices to be driven by one or more belts. Finally, as stated previously, the means for operably connecting can support devices without additional structure and it allows the input shaft bearings on one device to be the only support for the engine's drive shaft external to the engine.

INDUSTRIAL APPLICABILITY

The invented interconnect casing and power divider is applicable in any situation where it is desired that a single engine drive a plurality of devices. It is particularly useful in a foam discharging apparatus where a single engine drives both an air compressor and a fluid pump. While the preferred embodiments of the interconnect casing and power divider have been disclosed, it should be understood that certain variations and modifications may be made thereto without departing from the spirit of the invention.

I claim:

1. A foam discharging apparatus comprising:
- an air/water mixing tank operable to mix air and water admitted thereto;
- a hose having two ends with one end connected to the air/water mixing tank and the other end having a nozzle;
- an engine having a first drive shaft extending from one end thereof;
- an interconnect casing including a first flange mounted to the engine around the first drive shaft, a second flange, a spacer connected to and intermediate the first and second flanges holding the first and second flanges apart, an aperture in the spacer allowing access to the first drive shaft, and a bracket arm attached to one of the flanges;
- a fluid pump driven by the first drive shaft and mounted to the second flange, the fluid pump having an intake and an exhaust;
- a water reservoir and means connecting the water reservoir to the fluid pump's intake;
- a first fluid output channeling means connecting the fluid pump's exhaust to the air/water mixing tank, the first fluid output channeling means including a foam concentrate reservoir and an injection means connected to the foam concentrate reservoir for injecting foam concentrate into the water;
- an air compressor mounted to the bracket arm and having a second drive shaft;
- a belt extending through the aperture in the interconnect casing and around both the first drive shaft and the second drive shaft; and
- the air compressor having an exhaust through which the compressed air flows, and second fluid output channeling means connecting the air compressor's exhaust with the air/water mixing tank.

2. An interconnect casing for interconnecting two devices to an engine, the interconnect casing comprising:
- a tube-like segment having first and second ends, a hollow interior extending between the ends, and an open face defined by each end;
- a first annular flange concentric and joining with the first end of the tube-like segment for mounting to the engine, where the first annular flange borders the open face defined by the first end of the tube-like segment;
- a second annular flange concentric and joining with the second end of the tube-like segment for mounting to one of the devices, where the second annular flange borders the open face defined by the second end of the tube-like segment;
- an opening in the tube-like segment between the first and second flanges for allowing access to the hollow interior of the tube-like segment; and
- support means connected to one of the flanges for supporting one of the devices;
- where the support means includes a first plate connected to the first annular flange and a second plate adjustably connected to the first plate.

3. The apparatus comprising:
- an engine;
- a drive shaft driven by the engine;
- at least one bearing internal to the engine supporting the drive shaft;
- an interconnect casing including a tube-like segment having first and second ends with the first end mounted to the engine around the drive shaft, a bracket arm connected to the tube-like segment, and an aperture in the tube-like segment;
- a firsts device mounted on the second end of the interconnect casing directly engaging and driven by the drive shaft;
- at least one bearing internal to the first device supporting the drive shaft;
- a second device mounted on the bracket arm and driven by the drive shaft;
- a pulley on the drive shaft; and
- a belt extending through the aperture in the tube-like segment and around the pulley on the drive shaft to power the second device;
- where the only bearings supporting the drive shaft are internal to the engine and the first device; and
- where the bracket arm includes a first plate connected to the tube-like segment and a second plate adjustably connected to the first plate.

4. The apparatus comprising:
- an engine;
- a drive shaft driven by the engine;
- an interconnect casing including a tube-like segment having first and second ends with the first end mounted to the engine around the drive shaft, a bracket arm connected to the tube-like segment, and an aperture in the tube-like segment;
- a firsts device mounted on the second end of the interconnect casing directly engaging and driven by the drive shaft;
- a second device mounted on the bracket arm and driven by the drive shaft;
- a pulley on the drive shaft; and a belt extending through the aperture in the tube-like segment and around the pulley on the drive shaft to power the second device;

where the extent of the drive shaft within the tube-like segment is continuous;

where the bracket arm includes a first plate connected to the tube-like segment and a second plate adjustably connected to the first plate.

5. A power divider capable of driving at least two devices, the power divider comprising:

an engine including a housing and a face flange on the housing;

a crank shaft driven by the engine;

a flywheel joined to the crank shaft;

a flywheel housing jointed to the engine's face flange around the flywheel;

a flexplate joined to the flywheel;

a stub shaft connected to the flexplate; and an interconnect casing including a tube-like segment having first and second ends, a hollow interior extending between the ends, and an open face defined by each end, a first annular flange concentric and joining with the first end of the tube-like segment mounted to the flywheel housing, where the first annular flange borders the open face defined by the first end of the tube-like segment, a second annular flange concentric and joining with the second end of the tube-like segment mounted to one of the devices, where the second annular flange borders the open face defined by the second end of the tube-like segment, a bracket arm connected to one of the flanges for supporting another one of the devices, and an aperture in the tube-like segment between the flanges allowing access to the drive shaft for the power connection of the device supported by the bracket am;

where the extend of the stub shaft within the tube-like segment is continuous.

* * * * *